(12) United States Patent
Penzo et al.

(10) Patent No.: US 9,399,688 B2
(45) Date of Patent: Jul. 26, 2016

(54) MULTISTAGE PROCESS FOR THE POLYMERIZATION OF OLEFINS

(71) Applicant: Basell Polyolefine GmbH, Wesseling (DE)

(72) Inventors: Giuseppe Penzo, Ferrara (IT); Gabriele Mei, Ferrara (IT); Gerhardus Meier, Frankfurt/M (DE); Ulf Schueller, Frankfurt (DE); Antonio Ciarrocchi, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 14/889,794

(22) PCT Filed: May 13, 2014

(86) PCT No.: PCT/EP2014/059680
§ 371 (c)(1),
(2) Date: Nov. 6, 2015

(87) PCT Pub. No.: WO2014/184152
PCT Pub. Date: Nov. 20, 2014

(65) Prior Publication Data
US 2016/0108147 A1   Apr. 21, 2016

(30) Foreign Application Priority Data

May 16, 2013   (EP) ..................... 13168101

(51) Int. Cl.
*C08F 2/00* (2006.01)
*B01J 19/18* (2006.01)
*C08F 110/02* (2006.01)
*B01J 19/24* (2006.01)

(52) U.S. Cl.
CPC ............. *C08F 110/02* (2013.01); *B01J 19/245* (2013.01); *B01J 2219/24* (2013.01)

(58) Field of Classification Search
CPC ..... C08F 110/02; B01J 19/245; B01J 2219/24
USPC ............................................. 526/65; 422/134
See application file for complete search history.

(56) References Cited

U.S. PATENT DOCUMENTS

| 4,703,094 A | 10/1987 | Raufast |
| 5,728,353 A * | 3/1998 | Govoni ...................... B01J 8/26 422/131 |
| 2010/0305283 A1* | 12/2010 | Dorini .................... B01J 8/1809 526/64 |

FOREIGN PATENT DOCUMENTS

| EP | 0192427 A1 | 8/1986 |
| WO | WO 2008/058839 A2 | 5/2008 |
| WO | WO 2009/037080 A1 | 3/2009 |

OTHER PUBLICATIONS

PCT International Search Report & Written Opinion mailed Nov. 13, 2014 for PCT/EP2014/059680.

*Primary Examiner* — William Cheung

(57) ABSTRACT

A process for polymerizing olefins at temperatures of from 30° C. to 140° C. and pressures of from 1.0 MPa to 10 MPa in the presence of a polymerization catalyst in a multistage polymerization of olefins in at least two serially connected gas-phase polymerization reactors, and apparatus for the multistage polymerization of olefins, comprising at least two serially connected gas-phase polymerization reactors and a device for transferring polyolefin particles from an up-stream gas-phase polymerization reactor to a downstream gas-phase polymerization reactor, the transferring device comprising—a gas/solid separation chamber placed downstream of the upstream gas-phase polymerization which gas/solid separation chamber is equipped at a lower part with an net for introducing a fluid, and—connected to the gas/solid separation chamber at least two lock hoppers, placed in a parallel arrangement, each connected to the downstream gas-phase polymerization reactor.

9 Claims, 1 Drawing Sheet

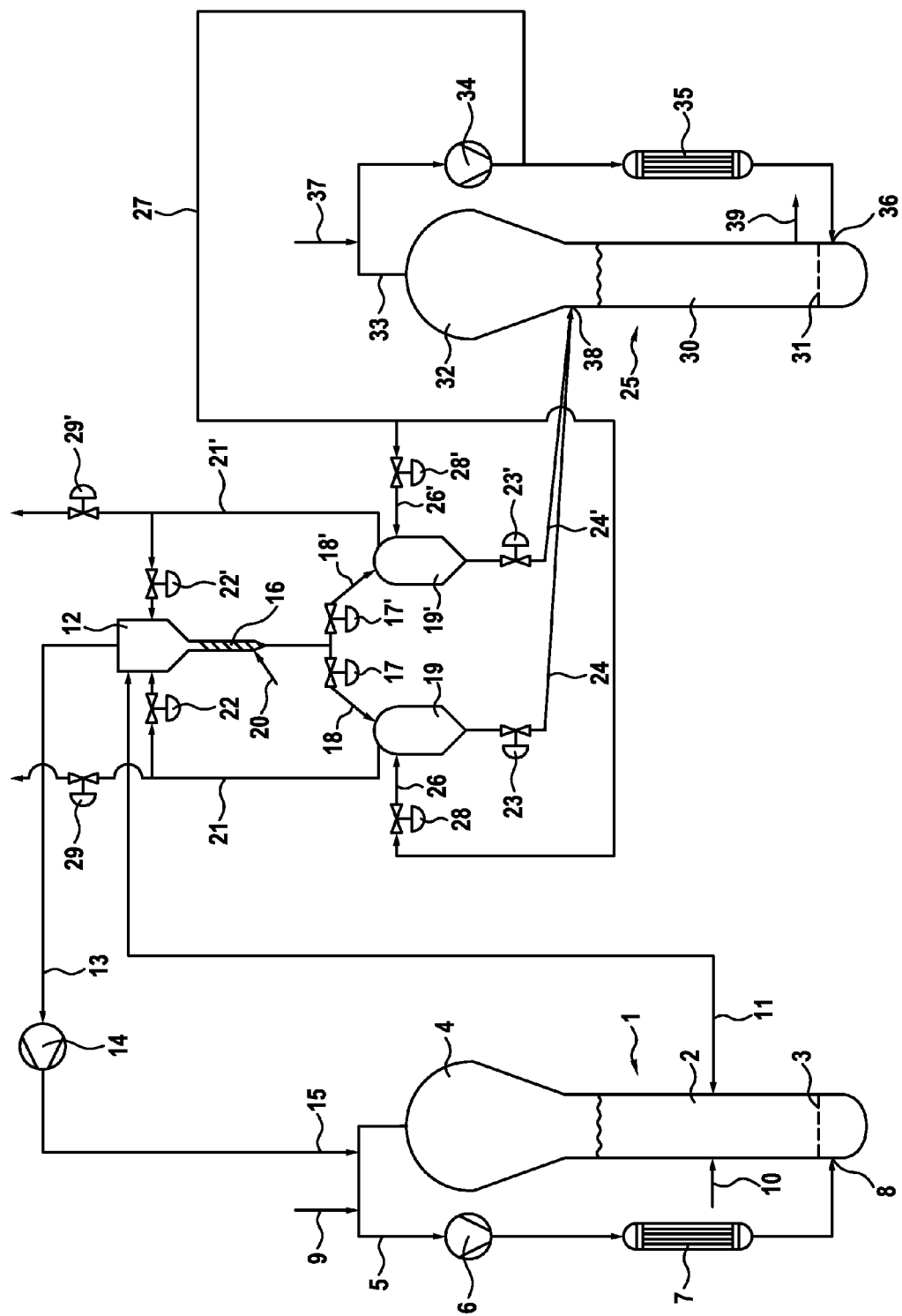

MULTISTAGE PROCESS FOR THE POLYMERIZATION OF OLEFINS

This application is the U.S. National Phase of PCT International Application PCT/EP2014/059680, filed May 13, 2014, claiming benefit of priority to European Patent Application No. 13168101.7, filed May 16, 2013, the disclosures of which are incorporated herein by reference in their entirety.

FIELD OF THE INVENTION

The present disclosure relates to a process for polymerizing olefins at temperatures of from 30° C. to 140° C. and pressures of from 1.0 MPa to 10 MPa in the presence of a polymerization catalyst in a multistage polymerization of olefins in at least two serially connected gas-phase polymerization reactors.

BACKGROUND OF THE INVENTION

The polymerization of olefins in two or more serially connected gas-phase reactors allows for the production of olefin polymers with improved properties and/or simplification of the existing production processes. This process is made possible by choosing polymerization conditions in the second reactor or subsequent reactors that differ from the reaction conditions existing in the first polymerization reactor. Olefin polymers may grow on particles that include a catalyst component, which continues to exert a catalytic activity even when the polymer particles are transferred to a successive gas-phase reactor. The polymer resulting from the first gas-phase reactor may be transferred to a second gas-phase reactor, where polymerization is continued under different conditions. Therefore, different fractions of polymer can grow on the same particle by maintaining a different composition of the gas-phase mixture in each reactor.

Examples of polymers that may be produced by a multistage gas-phase process include bimodal or multimodal polymers obtained by maintaining a different concentration of a chain terminator, such as hydrogen, in each reactor; and random or heterophasic copolymers obtained by polymerizing different (co)monomers in each reactor. The term "heterophasic copolymer" includes in-reactor polymer blends.

The transfer of the polymer from one gas-phase reactor to another one is a further step in a multistage polymerization process. A direct discharge of polymer from an upstream reactor to a downstream reactor does not allow for maintaining significantly different polymerization conditions in the downstream reactor due to the amount of gases and dissolved hydrocarbons associated with the polymer transferred to the downstream reactor.

A possible solution to this problem is degassing the solid polymer discharged from the upstream reactor, then subjecting the polymer to a compression stage and transferring it to the downstream polymerization reactor. A similar process is disclosed in EP 192 427 A1, which describes a process in which the compression stage is performed by means of the reaction gas mixture of the downstream reactor at a temperature lower by at least 20° C. than the temperature of the downstream reactor. EP 050 013 A2 refers to a process for polymerizing an olefin in the gaseous phase in a multiplicity of steps in at least two independent polymerization zones connected to each other by a transfer passage by which a gaseous stream containing the polymer obtained in a first polymerization zone is transferred into a second polymerization zone. The process is characterized in that an inert gas zone is provided in the transfer passage and at least a part of the gas components of the gaseous stream containing the polymer is replaced by an inert gas. However, the individual steps of the transfer processes described therein must be carried out subsequently, such that the operations are performed periodically and therefore do not provide a continuous transfer of polymer from the upstream reactor to the downstream polymerization reactor.

EP 1 040 868 A2 discloses a method of multistage gas phase polymerization in which polymerization of a feed gas mixture comprising ethylene, an alpha-olefin and hydrogen is carried out in an upstream arranged fluidized-bed reactor. The polymer powder taken up from the upstream arranged fluidized-bed reactor is treated with a gas to lower the content of alpha-olefin gas and hydrogen gas in the polymeric powder and then introduced into a downstream arranged reactor. WO 2008/058839 A2 discloses a process for the multistage polymerization of olefins which allows for continuously discharging of the polymer and the gas reaction mixture from the upstream reactor into a transfer device and continuously feeding of the polymer from the transfer device to a downstream reactor via a transfer device comprising a separation chamber, in which the gas reaction mixture is removed from the polymer, and at least two lock hoppers, which work intermittently in parallel. A Although both processes reduce the amount of gas components of the reaction gas of the upstream reactor, which are transferred along with the polyolefin particle to the downstream reactor, minor amounts of the reaction gas components of the upstream reactor are still carried over into the downstream reactor. A reliable process for continuously transferring polyolefin particles from a first gas-phase polymerization reactor to a second gas-phase polymerization reactor which allows little or no reaction gas of the first gas-phase polymerization reactor to be introduced into the second gas-phase polymerization reactor would therefore benefit olefin polymerization and polymer processing.

SUMMARY OF THE INVENTION

We found that this object is achieved by a process for polymerizing olefins at temperatures of from 30° C. to 140° C. and pressures of from 1.0 MPa to 10 MPa in the presence of a polymerization catalyst in a multistage polymerization of olefins in at least two serially connected gas-phase polymerization reactors, the process for transferring polyolefin particles from a first gas-phase polymerization reactor to a second gas-phase polymerization reactor comprising the steps of: a) discharging polyolefin particles from the first gas-phase polymerization reactor into a separation chamber in which the polyolefin particles are separated from concomitantly discharged reaction gas, the separation chamber being at a lower pressure than the pressure in the first gas-phase polymerization reactor; b) transferring the polyolefin particles within the separation chamber into a lower part of the separation chamber which contains a bed of polyolefin particles which moves from top to bottom of this part of the separation chamber and into which a fluid is introduced in an amount that an upward stream of the fluid in the bed of polyolefin particles above the fluid introduction point is induced; c) withdrawing polyolefin particles from the lower end of said lower part and transferring the polyolefin particles to one of at least two lock hoppers working intermittently in parallel; and d) simultaneously pressurizing another of the at least two lock hoppers working intermittently by means of a gas comprising reaction gas coming from the second gas-phase polymerization reactor.

An apparatus for the multistage polymerization of olefin is further disclosed and comprises at least two serially connected gas-phase polymerization reactors and a device for transferring polyolefin particles from an upstream gas-phase polymerization reactor to a downstream gas-phase polymerization reactor, the transferring device comprising a gas/solid separation chamber placed downstream of the upstream gas-phase polymerization which gas/solid separation chamber is equipped at a lower part with an inlet for introducing a fluid, and connected to the gas/solid separation chamber at least two lock hoppers, placed in a parallel arrangement, each connected to the downstream gas-phase polymerization reactor.

BRIEF DESCRIPTION OF THE DRAWING

FIG. 1 shows a multistage schematic for olefin polymerization in accordance with some embodiments of the present invention.

DETAILED DESCRIPTION OF THE INVENTION

The present technology can be better understood via the following description for a multistage gas-phase polymerization of olefins. Olefins for use in the polymerization process of the present technology include 1-olefins, i.e. hydrocarbons having terminal double bonds, without being restricted thereto. Olefins monomers for use in the present technology may also be functionalized, olefinically unsaturated compounds such as esters and amide derivatives of acrylic or methacrylic acid, for example acrylates, methacrylates and acrylonitrile, as well as non-polar olefinic compounds, including aryl-substituted 1-olefins.

Examples of 1-olefins for use in the present technology are linear and branched $C_2$-$C_{12}$-1-alkenes, in particular linear $C_2$-$C_{10}$-1-alkenes such as ethylene, propylene, 1-butene, 1-pentene, 1-hexene, 1-heptene, 1-octene, 1-decene or branched $C_2$-$C_{10}$-1-alkenes such as 4-methyl-1-pentene, conjugated and non-conjugated dienes such as 1,3-butadiene, 1,4-hexadiene or 1,7-octadiene or vinylaromatic compounds such as styrene or substituted styrene. It is also possible to polymerize mixtures of various 1-olefins. Additional olefins also include ones in which the double bond is part of a cyclic structure which can have one or more ring systems. Examples include cyclopentene, norbornene, tetracyclododecene or methylnorbornene or dienes such as 5-ethylidene-2-norbornene, norbornadiene or ethylnorbornadiene. In accordance with the present technology, it is also possible to polymerize mixtures of two or more olefins.

The process of the present technology may be used in the homopolymerization or copolymerization of ethylene or propylene and the homopolymerization or copolymerization of ethylene. Comonomers for use in the present technology include propylene polymerization with up to 40 wt. % of ethylene and/or 1-butene, including from 0.5 wt.-% to 35 wt.-% of ethylene and/or 1-butene. Comonomers for use in the present technology include $C_3$-$C_8$-1-alkenes, including 1-butene, 1-pentene, 1-hexene and/or 1-octene, at concentrations up to 20 wt. %, including from 0.01 wt. % to 15 wt. % and from 0.05 wt. % to 12 wt. %. In some embodiments, the present technology relates to a process in which ethylene is copolymerized with from 0.1 wt. % to 12 wt. % of 1-hexene and/or 1-butene.

In accordance with some embodiments of the present disclosure, a process for polymerizing olefins is carried out by polymerizing in at least two gas-phase polymerization reactors, i.e. in reactors in which the solid polymers are obtained from a gas-phase comprising the monomer or the monomers.

The polymerization may be carried out at pressures of from 1.0 to 10 MPa, including from 1.5 to 5 MPa. The polymerization temperature may occur in a range of from 30 to 150° C., including from 65 to 125° C. The polymerization of olefins, in accordance with certain embodiments of the present technology, can be carried out using commercially available olefin polymerization catalysts. In non-limiting examples, the polymerization can be carried out using Phillips catalysts based on chromium oxide, using titanium-based Ziegler- or Ziegler-Natta-catalysts, or using single-site catalysts.

In accordance with the present technology, single-site catalysts are catalysts based on chemically uniform transition metal coordination compounds. Single-site catalysts may include catalysts comprising bulky sigma- or pi-bonded organic ligands, e.g. catalysts based on mono-Cp complexes, catalysts based on bis-Cp complexes, which are alternatively referred to as metallocene catalysts, or catalysts comprising late transition metal complexes, including iron-bisimine complexes. Furthermore, it is also possible to use mixtures of two or more of these catalysts for the polymerization of olefins. Such mixed catalysts may be referred to as hybrid catalysts. Ziegler type catalysts comprising a compound of titanium or vanadium, a compound of magnesium and optionally an electron donor compound and/or a particulate inorganic oxide as support may be utilized in accordance with the present technology.

Titanium compounds, including halides and/or alkoxides of trivalent or tetravalent titanium such as titanium alkoxy halogen compounds or mixtures of various titanium compounds also being possible, may be used in accordance with the present technology. Examples of titanium compounds include $TiBr_3$, $TiBr_4$, $TiCl_3$, $TiCl_4$, $Ti(OCH_3)Cl_3$, $Ti(OC_2H_5)Cl_3$, $Ti(O-i-C_3H_7)Cl_3$, $Ti(O-n-C_4H_9)Cl_3$, $Ti(OC_2H_5)Br_3$, $Ti(O-n-C_4H_9)Br_3$, $Ti(OCH_3)_2Cl_2$, $Ti(OC_2H_5)_2Cl_2$, $Ti(O-n-C_4H_9)_2Cl_2$, $Ti(OC_2H_5)_2Br_2$, $Ti(OCH_3)_3Cl$, $Ti(OC_2H_5)_3Cl$, $Ti(O-n-C_4H_9)_3Cl$, $Ti(OC_2H_5)_3Br$, $Ti(OCH_3)_4$, $Ti(OC_2H_5)_4$ and $Ti(O-n-C_4H_9)_4$. Titanium halides, including titanium chlorides such as titanium tetrachloride, may be used in accordance with the present technology. Vanadium compounds such as vanadium halides, vanadium oxyhalides, vanadium alkoxides and vanadium acetylacetonates, including vanadium compounds in the oxidation states 3 to 5, may be utilized in accordance with the present technology.

In the production of the solid component, at least one compound of magnesium may be used. Compounds of this type include halogen-containing magnesium compounds, such as magnesium chlorides and magnesium bromides, as well as magnesium compounds from which the magnesium halides can be obtained in a customary way, e.g. by reaction with halogenating agents. In accordance with the present technology, halogens include chlorine, bromine, iodine and fluorine and/or mixtures of two or more halogens. Magnesium compounds from which the halides can be obtained are, for example, magnesium alkyls, magnesium aryls, magnesium alkoxy compounds or magnesium aryloxy compounds or Grignard compounds. Halogenating agents may include halogens such as chlorine, hydrogen halides, $SiCl_4$, $CCl_4$ and hydrogen chloride.

Examples of halogen-free compounds of magnesium for use in the present technology include diethylmagnesium, di-n-propylmagnesium, diisopropylmagnesium, di-n-butylmagnesium, di-sec-butylmagnesium, di-tert-butylmagnesium, diamylmagnesium, n-butylethylmagnesium, n-butyl-sec-butylmagnesium, n-butyloctylmagnesium, diphenylmagnesium, diethoxymagnesium, di-n-propyloxymagnesium, diisopropyloxymagnesium, di-n-butyloxymagnesium, di-sec-butyloxymagnesium, di-tertbutyloxymagnesium, di-amyloxymagnesium, n-butyloxyethoxymagnesium, n-butyloxy-sec-butyloxymagnesium, n-butyloxyoctyloxymagnesium and diphenoxymagnesium.

Examples of Grignard compounds for use in the present technology include methylmagnesium chloride, ethylmagnesium chloride, ethylmagnesium bromide, ethyl-magnesium iodide, n-propylmagnesium chloride, n-propylmagnesium bromide, n-butylmagnesium chloride, n-butylmagnesium bromide, sec-butylmagnesium chloride, sec-butylmagnesium bromide, tert-butylmagnesium chloride, tert-butylmagnesium bromide, hexylmagnesium chloride, octylmagnesium chloride, amylmagnesium chloride, isoamylmagnesium chloride, phenylmagnesium chloride and phenylmagnesium bromide. Magnesium compounds for producing the particulate solids may include magnesium dichloride, magnesium dibromide and di($C_1$-$C_{10}$-alkyl)magnesium compounds.

In some embodiments, the Ziegler-Natta catalyst comprises a transition metal selected from titanium, zirconium, vanadium, chromium. Electron donor compounds for preparing Ziegler type catalysts may include alcohols, glycols, esters, ketones, amines, amides, nitriles, alkoxysilanes and aliphatic ethers. These electron donor compounds can be used alone or in mixtures with other electron donor compounds. Alcohols of the general formula $R^1OH$, in which the $R^1$ group is a $C_1$-$C_{20}$ hydrocarbon group including a $C_1$-$C_{10}$ alkyl group, may be utilized in accordance with the present technology. Examples are methanol, ethanol, isopropanol and n-butanol. Glycols for use in the present technology include those having a total number of carbon atoms lower than 50, including the 1,2 or 1,3 glycols having a total number of carbon atoms lower than 25. Examples include ethylene glycol, 1,2-propylene glycol and 1,3-propylene glycol.

Esters for use with the present technology include alkyl esters of $C_1$-$C_{20}$ aliphatic carboxylic acids including $C_1$-$C_8$ alkyl esters of aliphatic mono carboxylic acids such as ethylacetate, methylformiate, ethylformiate, methylacetate, propylacetate, i-propylacetate, n-butylacetate and i-butylacetate. Amines for use with the present technology include those of the general formula $NR^2{}_3$ in which the $R^2$ groups are, independently, hydrogen or a $C_1$-$C_{20}$ hydrocarbon group and the $R^2$ groups are not simultaneously hydrogen. In some embodiments, $R^2$ is a $C_1$-$C_{10}$ alkyl group. Examples of amines include diethylamine, diisopropylamine and triethylamine Amides of the general formula $R^3CONR^4{}_2$, in which $R^3$ and $R^4$ are, independently, hydrogen or a $C_1$-$C_{20}$ hydrocarbon group, including are formamide and acetamide, may be utilized in accordance with the present technology. Nitriles of the general formula $R^1CN$, where the $R^1$ group is a $C_1$-$C_{20}$ hydrocarbon group including a $C_1$-$C_{10}$ alkyl group, e.g. acetonitrile, may be used in accordance with the present disclosure. Alkoxysilanes for use with the present technology include those of the general formula $R^5{}_aR^6{}_bSi(OR^7)_c$, where a and b are each an integer from 0 to 2, c is an integer from 1 to 4 and the sum (a+b+c) is 4; and $R^5$, $R^6$, and $R^7$, are alkyl, cycloalkyl or aryl radicals with 1-18 carbon atoms optionally containing heteroatoms, including silicon compounds in which a is 0 or 1, c is 2 or 3, $R^6$ is an alkyl or cycloalkyl group, optionally containing heteroatoms, and $R^7$ is methyl. Examples of such silicon compounds include methyltrimethoxysilane, dimethyldimethoxysilane, trimethylmethoxysilane and t-butyltrimethoxysilane. Electron donor compounds selected from the group consisting of amides, esters, and alkoxysilanes may be used in accordance with the present disclosure.

Ziegler type catalysts may be polymerized in the presence of a cocatalyst, which may include organometallic compounds comprising Group 1, 2, 12, 13 or 14 metals of the Periodic Table of Elements, including organometallic compounds comprising Group 13 metals such as organoaluminum compounds. Cocatalysts for use with the present technology include organometallic alkyls, organometallic alkoxides and organometallic halides. Organometallic compounds comprising lithium alkyls, magnesium or zinc alkyls, magnesium alkyl halides, aluminum alkyls, silicon alkyls, silicon alkoxides and silicon alkyl halides may be used in accordance with the present disclosure, including organometallic compounds comprising aluminum alkyls and magnesium alkyls such as trialkylaluminum compounds. The aluminum alkyls may comprise, in certain embodiments, trimethylaluminum, triethylaluminum, tri-isobutylaluminum, tri-n-hexylaluminum and related compounds.

The process of the present technology may be performed in at least two serially connected gas-phase polymerization reactors. Gas-phase polymerization reactors for use in the present technology may include horizontally or vertically stirred gas-phase reactors, multizone gas-phase reactors and gas-phase fluidized-bed reactors. Gas-phase polymerization reactors may inculde fluidized-bed polymerization reactors in which the polymerization takes place in a bed of polymer particles maintained in a fluidized state by feeding in reaction gas at the lower end of a reactor, including below a gas distribution grid having the function of dispensing the gas flow, and removing the gas at its upper end. The reaction gas may then be returned to the lower end to the reactor via a recycle line equipped with a compressor and a heat exchanger. The circulated reaction gas can be a mixture of the olefins to be polymerized, inert gases such as nitrogen and/or lower alkanes such as ethane, propane, butane, pentane or hexane and optionally a molecular weight regulator such as hydrogen. The velocity of the reaction gas has to be sufficiently high to fluidize the mixed bed of finely divided polymer present in the tube serving as polymerization zone and to subsequently remove the heat of polymerization effectively. The polymerization can also be carried out in a condensing or super-condensing mode, in which part of the circulating reaction gas is cooled to below the dew point and returned to the reactor separately as a liquid and a gas-phase or together as a two-phase mixture in order to make additional use of the enthalpy of vaporization for cooling the reaction gas.

Gas-phase polymerization reactors such as those described in WO 97/04015 and WO 00/02929, comprising two interconnected polymerization zones and a riser, in which the growing polymer particles flow upward under fast fluidization or transport conditions and a downcomer, in which the growing polymer particles flow in a densified form under the action of gravity, may be used in accordance with the present disclosure. The polymer particles leaving the riser may enter the downcomer and the polymer particles leaving the downcomer may be reintroduced into the riser, thus establishing a circulation of polymer between the two polymerization zones. The polymer may be passed a plurality of times through these two zones. It is further also possible to operate the two polymerization zones of one multizone circulating reactor under different polymerization conditions by establishing different polymerization conditions in the riser and the downcomer. For this purpose, the gas mixture leaving the riser and entraining the polymer particles can be partially or totally prevented from entering the downcomer, which may be achieved by feeding a barrier fluid in form of a gas and/or a liquid mixture into the downcomer, such as in the upper part of the downcomer.

The barrier fluid may be chemically different from the gas mixture present in the riser. The amount of added barrier fluid can be adjusted in a way that an upward flow of gas countercurrent to the flow of the polymer particles is generated, particularly at the top thereof, acting as a barrier to the gas mixture entrained among the particles coming from the riser. Accordingly, it is possible to obtain two different gas composition zones in one multizone circulating reactor and to introduce make-up monomers, comonomers and molecular weight regulators such as hydrogen and/or inert fluids at any point of the downcomer, such as below the barrier feeding point. It is also possible to create varying monomer, comonomer and hydrogen concentrations along the downcomer resulting in a further differentiation of the polymerization conditions. The polymerization may be carried out in the presence of a $C_3$-$C_5$ alkane as a polymerization diluent, including in the presence of propane during the homopolymerization or copolymerization of ethylene.

The obtained polyolefin particles have a generally regular morphology and size that depends on the catalyst morphology and size as well as on the polymerization conditions. Depending on the catalyst used, the polyolefin particles may have a mean diameter of from a few hundred to a few thousand micrometers, including from about 300 to about 1600 μm, and in the case of Ziegler type catalysts from about 500 to about 3000 μm. The process for polymerizing olefins according to the present technology may be carried out in a multi-stage polymerization of olefins in at least two serially connected gas-phase polymerization reactors. Beside the minimum two gas-phase polymerization reactors, the multistage polymerization of olefins may comprise additional polymerization stages carried out in additional reactors. These additional polymerization reactors can be any kind of low-pressure polymerization reactors such as gas-phase reactors or suspension reactors. If the multistage polymerization of olefins includes polymerization in suspension, the suspension polymerization may be carried out upstream of the gas-phase polymerization. Reactors for carrying out such a suspension polymerization may include loop reactors and stirred tank reactors. Suspension media may include inert hydrocarbons such as isobutane or mixtures of hydrocarbons as well as the monomers themselves. Such additional polymerization stages, which are carried out in suspension, may also include a pre-polymerization stage. If the multistage polymerization of olefins comprises additional polymerization stages carried out in gas-phase, the additional gas-phase polymerization reactors can be any type of gas-phase reactors like horizontally or vertically stirred gas-phase reactors, fluidized-bed reactors or multizone circulating reactors. Such additional gas-phase polymerization reactors may be arranged at any point of the reactor cascade of the present technology.

According to the process for polymerizing olefins of the present technology, the process for transferring polyolefin particles from a first gas-phase polymerization reactor to a second gas-phase polymerization reactor comprises the steps of discharging polyolefin particles from the first gas-phase polymerization reactor into a separation chamber; transferring the polyolefin particles within the separation chamber into a lower part of the separation chamber which contains a bed of polyolefin particles which moves from top to bottom of this part of the separation chamber and into which a fluid is introduced; withdrawing polyolefin particles from the lower end of this part of the separation chamber and transferring the polyolefin particles to one of at least two lock hoppers working intermittently in parallel; and simultaneously pressurizing another of the at least two lock hoppers working intermittently by means of a gas comprising reaction, with the pressurizing gas coming from the second gas-phase polymerization reactor.

The discharging of polyolefin particles from the first gas-phase polymerization reactor into the separation chamber, in which the polyolefin particles are separated from concomitantly discharged reaction gas, can be carried out by various discontinuous or continuous methods pneumatically or with the aid of mechanical discharge systems. For fluidized-bed reactors, the discharging can be accomplished, in some embodiments, by discontinuously withdrawing the polyolefin particles from the fluidized-bed reactor through one or more discharge lines. Such a process for discharging polyolefin particles is described in WO 2012/175469 A1. The discharging of polyolefin particles may be carried out continuously, e.g. by withdrawing the polyolefin particles from a part of a circulation loop of a fluidized-bed reactor in which a continuous pneumatic recycle of polymer from the fluidization grid to an upper region of the fluidized-bed reactor. Such a continuous discharging process is described in WO 2007/071527 A1. In accordance with the present technology, It is also possible to operate a lateral discharge continuously.

The polyolefin particles may be discharged into a gas/solid separation chamber, in which the reaction gas mixture, which is concomitantly discharged with the polyolefin particles from the first gas-phase polymerization reactor, is removed. In accordance with the present technology, the separation chamber may be operated at a lower pressure than the pressure in the first gas-phase polymerization reactor. The pressure difference between the first gas-phase polymerization reactor and the gas/solid separation chamber may be at least 0.2 MPa, including at least 10 MPa. The pressure in the separation chamber may be in a range of from 0.12 to 0.4 MPa, including from 0.15 to 0.3 MPa. The pressure in the separation chamber is controlled by withdrawing gas from the separation chamber, including withdrawing gas from the top of the separation chamber. It is possible to discharge the gas withdrawn from the separation chamber as off-gas, and the gas may be pressurized and recycled to the first gas-phase polymerization reactor.

After being brought into the separation chamber, the polyolefin particles are transferred into a lower part of the separation chamber in which the polyolefin particles form a densified bed. This transfer may occur by gravity. At the lower end of this lower part of the separation chamber, polyolefin particles are withdrawn and transferred to one of the lock hoppers. Consequently, the polyolefin particles within this lower part of the separation chamber move downwards from top to bottom of this lower part via gravity. The polyolefin particles may move as plug flow from top to bottom of lower part of the separation chamber.

In some embodiments of the present technology, the lower part of the separation chamber is designed as a conduit of a diameter smaller than the diameter of an upper part of the separation chamber. The conduit may be arranged substantially vertically, where substantially vertically means that the angle between the longitudinal direction of the conduit and the vertical is not more than 40°, including not more than 10°. In further embodiments, the lower end of the conduit tapers conically to prevent a dead zone where polymer particles could get stuck. At its lower end, the lower part of the separation chamber is provided with at least one discharge valve through which the polyolefins particles are withdrawn from the separation chamber. Discharge valves in accordance with the present disclosure may include segmental ball or ball valves including a segmental ball valve and rotary plug valves. By regulating this valve, the discharge flow is controlled, which allows for keeping the bed level inside the separation chamber constant. The polyolefin particles may be continuously withdrawn from the lower end of the lower part of the separation chamber.

A fluid is fed into the lower part of the separation chamber in an amount that an upward stream of the fluid is induced in the bed of polyolefin particles above the fluid introduction point. The fluid may be introduced at a position near the lower end of the lower part of the separation chamber. It is also possible to feed the fluid at more than one position into the lower part of the separation chamber. In some embodiments, the fluid is fed in a way that it is distributed over the whole cross-section of the lower part of the separation chamber in a region above the fluid introduction point. It is possible to achieve such a distribution with means for adding a fluid and utilizing a gas distributor. The fed fluid can be a gas or a liquid, which evaporates under the conditions in the settling pipe, or can be a mixture of a gas and a liquid. Accordingly, the introduced fluid replaces the reaction gas of the first gas-phase polymerization reactor and acts as barrier, which prevents the reaction gas of the first gas-phase polymerization reactor from being transferred to the second polymerization reactor. The introduced fluid may be a component of the reaction gas mixtures of both the first and the second gas-phase polymerization reactor, such as an inert component including an inert gas including a saturated hydrocarbon such as propane. The amount of fed fluid may be regulated in a way that an effective upward stream of the fluid in the bed of polyolefin particles above the fluid introduction point is induced and reliably sustained. However, in certain embodiments the amount of introduced fluid may be restricted as an expansion of the bed in the settling pipe should be avoided under certain conditions. In addition, the amount of added inert fluid may need to be compensated with either the dilution of the reaction gas with the inert fluid or the need to purge a part of reaction gas.

The polyolefin particles withdrawn from the lower end of the lower part of the separation chamber are transferred to one of at least two lock hoppers working intermittently in parallel. For each of the lock hoppers, the following steps may be conducted subsequently in a recurring way: 1) loading with polyolefin particles coming from the lower part of the separation chamber while the lock hopper is isolated from the second gas-phase polymerization reactor; and 2) pressurizing by means of a gas comprising reaction gas coming from the second gas-phase polymerization reactor and discharging the polyolefin particles and transferring the polyolefin particles to the second gas-phase polymerization reactor while the lock hopper is isolated from the separation chamber, including in some embodiments continuing with the pressurizing of the lock hopper by means of the gas comprising reaction gas coming from the second gas-phase polymerization reactor when the polyolefin particles are transferred to the second gas-phase polymerization reactor.

To prevent that reaction gas coming from the second gas-phase polymerization reactor being transferred to the first gas-phase polymerization reactor, the lock hoppers may be depressurized before being again with polyolefin particles coming from the lower part of the separation chamber. For depressurizing the lock hoppers, it is possible to discharge the gas remaining in the lock hoppers after the polyolefin particles are transferred into the second gas-phase polymerization reactor as off-gas. It is however also possible to return this gas to the second gas-phase polymerization reactor by feeding it back to the second gas-phase polymerization reactor, e.g. to a gas recycle line at the suction side of the compressor. Since the lock hoppers operate intermittently in parallel, the step of transferring polyolefin particles from the separation chamber to one of the lock hoppers, loading the lock hopper and pressurizing another lock hopper by means of a gas comprising reaction gas coming from the second gas-phase polymerization reactor may occur simultaneously.

The process of the present technology may include at least two lock hoppers downstream of the separation chamber. The number of lock hoppers is theoretically discretionary, and may be carried out with from 2 to 4 lock hoppers, including 2 or 3 lock hoppers. When operating with two lock hoppers, one lock hopper may be involved with the step of loading while the other one is involved with the steps of pressurizing and transferring to the second gas-phase polymerization reactor step, or vice versa. The lock hoppers may have a conical lower portion, in some embodiments, with walls inclined of an angle greater that the repose angle of the polyolefin particles. In further embodiments, each lock hopper may be connected to the separation chamber by a separate discharge valve. The working in parallel of at least two lock hoppers maximizes the discharge flow rate from the first gas-phase polymerization reactor to a second gas-phase polymerization reactor and results in a continuous transfer of polyolefin particles. Furthermore, the combination of depressurizing and applying a countercurrent stream of a fluid, which acts as barrier, ensures that little or no reaction gas of the first gas-phase polymerization reactor is introduced into the second gas-phase polymerization reactor.

The present technology is further illustrated by FIG. 1, which shows schematically the set-up of two serially connected fluidized-bed reactors for carrying out some embodiments of the present technology, including embodiments wherein both the first and the second gas-phase polymerization reactor are fluidized-bed reactors. The first gas-phase polymerization reactor, fluidized-bed reactor (1), comprises a fluidized bed (2) of polyolefin particles, a gas distribution grid (3) and a velocity reduction zone (4). The velocity reduction zone (4) may comprise an increased diameter compared to the diameter of the fluidized-bed portion of the reactor. The polyolefin bed is kept in a fluidization state by an upward flow of gas fed through the gas distribution grid (3) placed at the bottom portion of the reactor (1). The gaseous stream of the reaction gas leaving the top of the velocity reduction zone (4) via recycle line (5) is compressed by compressor (6), transferred to a heat exchanger (7), in which it is cooled, and then recycled to the bottom of the fluidized-bed reactor (1) at a point below the gas distribution grid (3) at position (8). The recycle gas can, if appropriate, be cooled to below the dew point of one or more of the recycle gas components in the heat exchanger so as to operate the reactor with condensed material, i.e. in the condensing mode. The recycle gas can comprise, in addition to unreacted monomers, inert condensable gases, such as alkanes, as well as inert non-condensable gases, such as nitrogen. In accordance with some embodiments of the present technology, make-up monomers, molecular weight regulators, and optional inert gases or process additives can be fed into the reactor (1) at various positions, for example via line (9) upstream of the compressor (6). The catalyst may be fed into the reactor (1) via a line (10) that may be placed in the lower part of the fluidized bed (2).

The polyolefin particles obtained in fluidized-bed reactor (1) are continuously discharged via line (11) and fed to a solid/gas separator (12), which is operated at a pressure lower than the pressure within fluidized-bed reactor (1), including at a pressure of from 0.12 to 0.3 MPa. The pressure within solid/gas separator (12) is controlled by withdrawing gas from the solid/gas separator (12) via line (13), transferring it to compressor (14), and returning it after compression to fluidized-bed reactor (1) via line (15). Within the solid/gas separator (12), the polyolefin particles fall by gravity into a lower part (16), which is designed in the form of a conduit having a much smaller diameter than the upper part of the solid/gas separator (12) and which may be arranged substantially vertical as defined herein. The conduit (16) may be made of a uniform diameter, or may comprise more sections having decreasing diameters in the downward direction. The conduit (16) contains a bed of polyolefin particles which moves from the top to the bottom of the conduit. The lower end of conduit (16) is connected to two discharge valves (17) and (17'), which serve to transfer the polyolefin particles via lines (18) and (18') into two lock hoppers (19) and (19'). Discharge valves (17) and (17') may comprise segmental ball valves. In certain embodiments, the level of polyolefin particles in solid/gas separator (12) is kept almost constant by controlling the rates of transferring polyolefin particles into solid/gas separator (12) and discharging polyolefin particles from the lower end of conduit (16).

A fluid is introduced via a line (20) into the conduit (16), such as at a position near the lower end of the conduit in an amount that an upward stream of the fluid is induced in the bed of polyolefin particles. The introduced fluid may be an inert component, a saturated hydrocarbon such as propane. The propane may be taken from a gas recovery unit (not shown) in which purified propane is obtained by distillation or separation from off-gas of the polymerization reactors. The polyolefin particles are discharged from the lower end of conduit (16) via discharge valves (17) and (17') and lines (18) and (18') into lock hoppers (19) and (19'). This transfer generally occurs by gravity. Lock hoppers (19) and (19') are further equipped with venting lines (21) and (21') comprising valves (22) and (22') for transferring gas from the lock hoppers (19) or (19') back to the solid/gas separator (12). Lock hoppers (19) and (19') are provided, respectively, with bottom discharge valves (23) and (23') for transferring the polyolefin particles via transfer pipes (24) and (24') to the second fluidized-bed reactor (25). Discharge valves (23) and (23') may comprise segmental ball valves. Transfer pipes (24) and (24') may be inclined with respect to the vertical. The angle between the transfer pipes and the vertical, in some embodiments, is not greater than 45°, including in a range of from 15° to 30°. Lock hoppers (19) and (19') may be equipped with lines (26) and (26') for pressurizing the lock hoppers with reaction gas coming from the second fluidized-bed reactor (25) via line (27) through valves (28) and (28').

The filling of lock hopper (19) is performed by closing discharge valve (23) and opening valves (17) and (22). As a result, polyolefin particles move from solid/gas separator (12) into lock hopper (19). Pressure compensation occurs via venting line (21) through valve (22). Once lock hopper (19) is completely filled, valves (17) and (22) are closed while valves (23) and (28) are opened. Opening of valve (28) causes a pressurization of lock hopper (19) by a portion of the reaction gas coming from the second fluidized-bed reactor (25) through the line (27). The simultaneous opening of the discharge valve (23) allows transferring the polyolefin particles by combined effect of pressure and gravity through transfer pipes (24) into fluidized-bed reactor (25). When the polyolefin particles are discharged from lock hopper (19), valves (23) and (28) are closed. To prevent reaction gas coming from the second fluidized-bed reactor being transferred to the first fluidized-bed reactor, lock hopper (19) is depressurized and the reaction gas coming from the second fluidized-bed reactor is discharged as off-gas via line (21) and valve (29) before being filled again with polyolefin particles.

The same sequence of operations, but out of phase, is performed by the lock hopper (19'). While polyolefin particles are transferred from lock hopper (19) to fluidized-bed reactor (25), filling of lock hopper (19') is performed by closing discharge valve (23') and opening valves (17') and (22'). As a result, polyolefin particles move from solid/gas separator (12) into lock hopper (19'). Pressure compensation occurs via venting line (21') through valve (22'). When filling of lock hopper (19') is completed and lock hopper (19) is fully discharged, valves (17') and (22') are closed while valves (23') and (28') are opened. Opening of valve (28') causes a pressurization of lock hopper (19') by a portion of the reaction gas coming from the second fluidized-bed reactor (25) through the line (27). The simultaneous opening of discharge valve (23') allows transferring the polyolefin particles by combined effect of pressure and gravity through transfer pipes (24') into fluidized-bed reactor (25). When the polyolefin particles are discharged from lock hopper (19') and lock hopper (19) is filled again, valves (23') and (28') are closed and lock hopper (19') is depressurized via line (21') and valve (29').

The second gas-phase polymerization reactor, fluidized-bed reactor (25) is operated like the fluidized-bed reactor (1). It comprises a fluidized bed (30) of polyolefin particles, a gas distribution grid (31) and a velocity reduction zone (32). The polyolefin bed is kept in a fluidization state by an upwardly flow of gas fed through the gas distribution grid (31). The gaseous stream of the reaction gas leaving the top of the velocity reduction zone (32) via recycle line (33) is compressed by compressor (34), transferred to a heat exchanger (35), in which it is cooled, and then recycled to the bottom of the fluidized-bed reactor (25) at a point below the gas distribution grid (31) at position (36). Make-up monomers, molecular weight regulators, and optional inert gases can be fed into the reactor (25), for example, via line (37) upstream of the compressor (33). The polyolefin particles discharged from lock hoppers (19) and (19') via transfer pipes (24) and (24') enter the fluidized-bed reactor (25) at one or more points (38). Discharge of polyolefin particles from fluidized-bed reactor (25) and transfer to a successive polymerization reactor or to a finishing treatment stage may be carried out through one or more lines (39).

In certain embodiments, the present technology relates to an apparatus for the multistage polymerization of olefins, comprising at least two serially connected gas-phase polymerization reactors and a device for transferring polyolefin particles from an upstream gas-phase polymerization reactor to a downstream gas-phase polymerization reactor, the transferring device comprising: 1) a gas/solid separation chamber placed downstream of the upstream gas-phase polymerization which gas/solid separation chamber is equipped at a lower part with an inlet for introducing a fluid; and connected to the gas/solid separation chamber at least two lock hoppers, placed in a parallel arrangement, directly connected to the downstream gas-phase polymerization reactor. The lower part of the gas/solid separation chamber, which is equipped with the inlet for introducing the fluid, may comprise a conduit of a diameter smaller than the diameter of an upper part of the gas/solid separation chamber. This conduit may be arranged substantially vertically, where substantially vertically means that the angle between the longitudinal direction of the conduit and the vertical is not more than 40°, including not more than 10°. In further embodiments, the lower end of the conduit tapers conically. Each lock hopper of the apparatus may be connected to the lower part of the separation chamber through a separate discharge valve. Each lock hopper may further be connected to the second gas-phase polymerization reactor via a separated transfer pipe, wherein each of the transfer pipes comprises a discharge valve.

EXAMPLES

In the following non-limiting examples of the present technology, the melt flow rate $MFR_{2.16}$ was determined according to DIN EN ISO 1133:2005, condition D at a temperature of 190° C. under a load of 2.16 kg. The density was determined according to DIN EN ISO 1183-1:2004, Method A (Immersion) with compression molded plaques of 2 mm thickness. The compression molded plaques were prepared with a defined thermal history: pressed at 180° C., 20 MPa for 8 min with subsequent crystallization in boiling water for 30 min. The particle size distribution was determined through the use of a Tyler Testing Sieve Shaker RX-29 Model B available from Combustion Engineering Endecott provided with a set of twelve sieves, according to ASTM E-11-87, of 106, 125, 180, 300, 500, 710, 1000, 1400, 2000, 2800, 3350, and 4000 µm. The bulk density was determined according to DIN EN ISO 60:2000-01. The hydrogen concentration in the second fluidized-bed reactor (25) was determined by gas chromatography.

A homopolymerization of ethylene was carried out in the presence of hydrogen as molecular weight regulator and propane as inert diluent in the first fluidized-bed reactor (1) of a series of two connected fluidized-bed reactors as shown in FIG. 1. The cylindrical reaction part of the fluidized bed reactor (1) had an inner diameter of 1000 mm and a height of 3500 mm. The upper level of the fluidized bed was adjusted in a way that the mean residence time of the polyolefin particles in the first fluidized-bed reactor was always 2.0 h. Discharging of the polyolefin particles from the first fluidized-bed reactor (1) was carried out discontinuously with the utilized discharge valve intermittently opening with an opening time of each times 1 s.

The discharged polyolefin particles were transferred into a separation chamber (12) for separating the polyolefin particles from entrained reaction gas of the first fluidized-bed reactor (1). The separation chamber had an upper cylindrical part of an inner diameter of 600 mm and a height of 1000 mm. The lower part of the separation chamber was a vertically arranged conduit (16) comprising a cylindrical part with an inner diameter of 200 mm and a length 1250 mm. Below the cylindrical part, the conduit (16) was conically tapering over a length of 300 mm to the inner diameter of the discharge line of 40 mm. The middle part of the separation chamber connecting the upper cylindrical part of the separation chamber and the conduit part of the separation chamber had a height of 800 mm. Propane was fed as fluid into the conduit (16) at a position near the lower end of the conduit in order to prevent that the gas composition of the first fluidized-bed reactor, which was still contained in the interspace between the polyolefin particles, was carried over to the second fluidized-bed reactors.

The second fluidized-bed reactor was not operated as a polymerization reactor but as take-up device for the transferred polyethylene particles and accordingly the gas-phase of the second fluidized-bed reactor was pure propane. To keep the level of the fluidized bed in the second reactor constant, the same amount of polymer was discharged from the second reactor as was transferred from the first reactor. The pressure in the second reactor was kept constant by feeding fresh propane to compensate for gas losses in connection with discharging polymer particles from the second reactor. For carrying out the polymerization, a Ziegler catalyst was used which was prepared as described in Examples 1-6 of WO 2009/027266. The pre-polymerized solid catalyst component was then contacted with triisobutylaluminum (TIBAL) in liquid propane at 25° C. and a pressure of 2.5 MPa in a pre-contacting vessel in a weight ratio of 2 g TIBAL/g catalyst. The mean residence time of the catalyst in the pre-contacting vessel was 60 min.

Example 1

An ethylene polymerization with a production rate of 80 kg/h was carried out in the fluidized-bed reactor (1) at 80° C. and a pressure of 2.5 MPa. The composition of the reaction gas was 7.0 mol % ethylene, 21 mol % hydrogen and 72 mol % propane. The second fluidized-bed reactor (25) was held at a pressure of 2.4 MPa. The pressure of the separation chamber (12) was kept at 0.15 MPa. The produced polyethylene had a melt flow rate $MFR_{2.16}$ of 140 g/10 min and a density of 0.968 g/cm³. The average particle diameter of the obtained polyethylene particles was 1050 µm, 0.5% of the polyethylene particles had a particle diameter of less than 180 µm and the bulk density of the obtained polyethylene particles was 0.540 g/cm³. The discharge of the polyethylene particles was carried out intermittently with 10 openings of the discharge valve per hour, thus discharging in average 8 kg of polyethylene particles per opening. Propane was fed into the conduit (16) at a rate of 10 kg/h. After two hours of operating, the hydrogen concentration in the second fluidized-bed reactor (25) remained below the detection limit of 0.1 vol %. The operating conditions were therefore adequate for preventing the reaction gas of the first fluidized-bed reactor (1) from being transferred into the second fluidized-bed reactor (25).

Example 2

An ethylene polymerization similar to the polymerization of Example 1 was carried out; however the production rate was increased to 350 kg/h. The discharge of the polyethylene particles was carried out intermittently with 44 openings of the discharge valve per hour, thus discharging in average 8 kg of polyethylene particles per opening. Propane was fed into the conduit (16) at a rate of 44 kg/h. After two hours of operating the hydrogen concentration in the second fluidized-bed reactor (25) remained below the detection limit of 0.1 vol %, proving that no reaction gas of the first fluidized-bed reactor (1) was transferred into the second fluidized-bed reactor (25).

Example 3

The ethylene polymerization of Example 2 was repeated. The discharge of the polyethylene particles was carried out intermittently with 44 openings of the discharge valve per hour, thus discharging in average 8 kg of polyethylene particles per opening. Propane was fed into the conduit (16) at a rate of 30 kg/h. After two hours of operating the hydrogen concentration in the second fluidized-bed reactor (25) remained below the detection limit of 0.1 vol %. No reaction gas from the first fluidized-bed reactor (1) was therefore transferred into the second fluidized-bed reactor (25).

Comparative Example A

The ethylene polymerization of Example 2 was repeated. The discharge of the polyethylene particles was carried out intermittently with 44 openings of the discharge valve per hour, thus discharging in average 8 kg of polyethylene particles per opening. Propane was fed into the conduit (16) at a rate of 5 kg/h. Shortly after starting the transfer of polyethylene particles from the first to the second fluidized-bed reactor, hydrogen could be detected in the second reactor. After one hour of operating, a hydrogen concentration of 0.5 vol % was reached, showing that reaction gas of the first fluidized-bed reactor (1) was transferred into the second fluidized-bed reactor (25). Accordingly, a low amount of propane was fed into the conduit (16) to achieve an upward stream of propane in the bed of polyethylene particles in the conduit (16).

The invention claimed is:

1. A process for polymerizing olefins at temperatures of from 30° C. to 140° C. and pressures of from 1.0 MPa to 10 MPa in the presence of a polymerization catalyst in a multistage polymerization of olefins in at least two serially connected gas-phase polymerization reactors, the process for transferring polyolefin particles from a first gas-phase polymerization reactor to a second gas-phase polymerization reactor comprising the steps of:
   a) discharging polyolefin particles from the first gas-phase polymerization reactor into a separation chamber wherein the polyolefin particles are separated from concomitantly discharged reaction gas, the separation chamber being at a lower pressure than the pressure in the first gas-phase polymerization reactor;
   b) transferring the polyolefin particles within the separation chamber into a lower part of the separation chamber comprising a bed of polyolefin particles which moves from top to bottom of this part of the separation chamber and into which a fluid is introduced in an amount capable of producing an upward stream of the fluid in the bed of polyolefin particles above the fluid introduction point;
   c) withdrawing polyolefin particles from the lower end of the lower part of the separation chamber and transferring the polyolefin particles to at least one lock hopper operating intermittently in parallel; and
   d) simultaneously pressurizing one or more lock hoppers that do not comprise the polyolefin particles and operating intermittently by means of a gas comprising reaction gas coming from the second gas-phase polymerization reactor.

2. The process of claim 1, wherein the bed of polyolefin particles moves as plug flow from the top portion to the bottom portion of the lower part of the separation chamber.

3. The process of claim 1, wherein the lower part of the separation chamber comprising the bed of polyolefin particles comprises a conduit of a diameter smaller than the diameter of an upper part of the separation chamber.

4. The process of claim 3, wherein the conduit is arranged substantially vertically.

5. The process of claim 3, wherein the lower end of the conduit tapers conically.

6. The process of claim 1, wherein the multistage polymerization of olefins is a multistage polymerization selected from ethylene and ethylene and comonomer, wherein the polymerization in the first polymerization reactor is carried out in the presence of hydrogen.

7. The process of claim 1, wherein the fluid introduced into the conduit is an inert gas.

8. The process of claim 1, wherein the pressure in the separation chamber is in a range of from 0.12 to 0.4 MPa.

9. A process for polymerizing olefins according to claim 1, wherein one or more of the lock hoppers are optionally:
   loaded with polyolefin particles coming from the lower part of the separation chamber while the lock hopper is isolated from the second gas-phase polymerization reactor;
   pressurized using reaction gas from the second gas-phase polymerization reactor; and
   discharged of the polyolefin particles via transfer to the second gas-phase polymerization reactor while the lock hopper is isolated from the separation chamber.

* * * * *